No. 841,025. PATENTED JAN. 8, 1907.
P. LE SUEUR.
HUB ATTACHING DEVICE.
APPLICATION FILED JAN. 31, 1906.
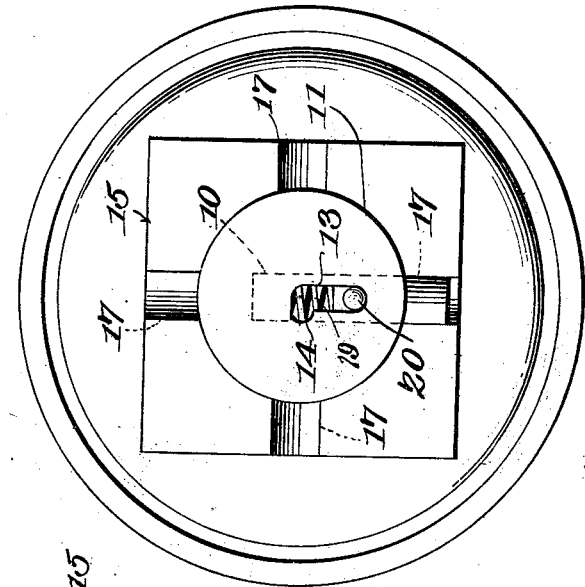
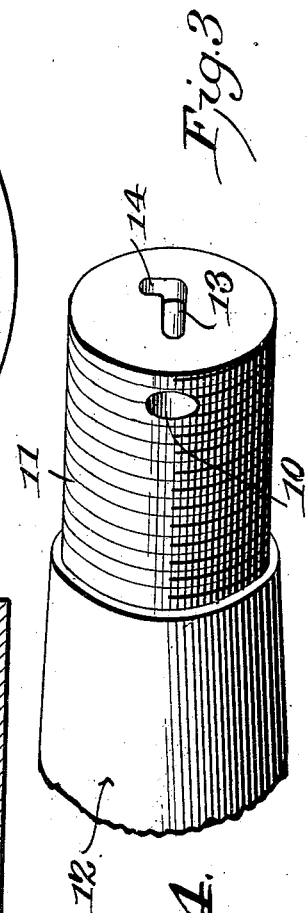
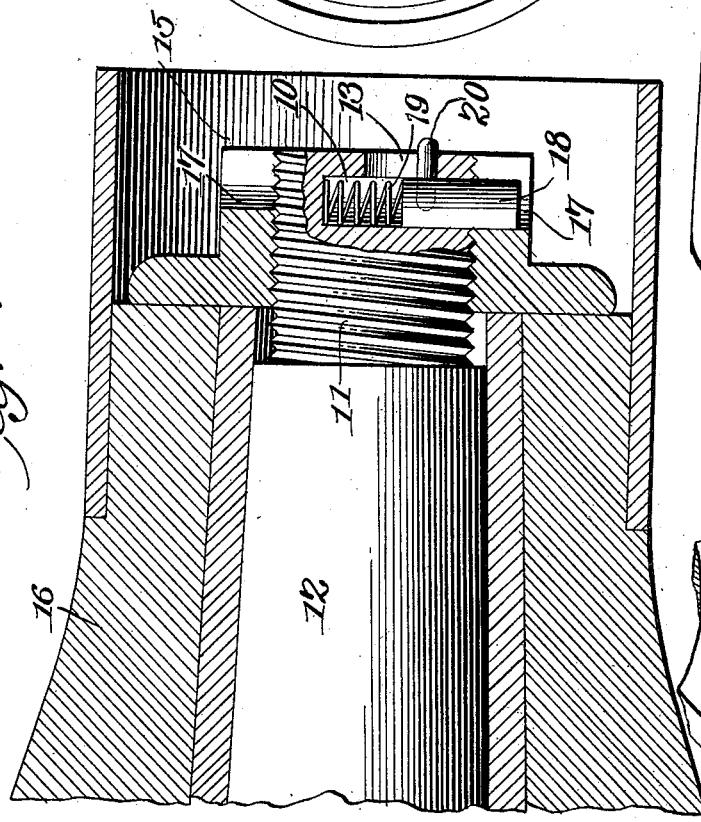
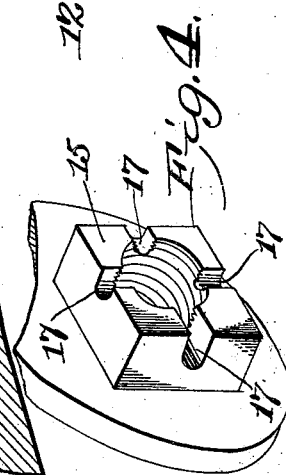
WITNESSES: Philip Le Sueur, INVENTOR.
By C. A. Snow & Co.
ATTORNEYS

UNITED STATES PATENT OFFICE.

PHILIP LE SUEUR, OF CALABASAS, CALIFORNIA.

HUB-ATTACHING DEVICE.

No. 841,025. Specification of Letters Patent. Patented Jan. 8, 1907.

Application filed January 31, 1906. Serial No. 298,858.

*To all whom it may concern:*

Be it known that I, PHILIP LE SUEUR, a citizen of the United States, residing at Calabasas, in the county of Los Angeles and State of California, have invented a new and useful Hub-Attaching Device, of which the following is a specification.

This invention relates to devices for attaching hubs to axle-journals, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a longitudinal sectional elevation of a portion of an axle-journal, hub, and binding-nut with the improvement applied. Fig. 2 is a front elevation of the same. Fig. 3 is a perspective view of a portion of the journal including the threaded end, illustrating the locations and forms of cavity and slot. Fig. 4 is a perspective view, on a reduced scale, of the axle-nut detached.

The improved device may be applied to any of the ordinary forms of axle-journals, hubs, and binding-nuts and consists in forming a transverse cavity 10 in the threaded portion 11 of the axle-journal 12 and with a slot 13 extending from this cavity through the end of the portion 11 and forming a lateral recess 14 in the inner end of the slot. The nut 15, which engages the threaded portion 11 and bears against the hub, (indicated at 16,) is provided with radial sockets 17 for registering one at a time with the cavity 10 when the nut is rotated. Movably disposed in the cavity 10 is a bolt 18, maintained yieldably in projected position by a spring 19, the bolt being designed to be projected into the sockets 17 one at a time to lock the nut fast to the journal and prevent the accidental displacement of the same. A pin 20 extends from the bolt 18 through the slot 13 and projects a sufficient distance beyond the end of the journal portion 11 to be grasped by the finger or thumb of the operator and provides means for moving the bolt to release it from the socket in the nut. When the pin is moved to the end of the slot, it can be turned sidewise into the recess 14, and thus hold the bolt in withdrawn position and enable the nut to be detached. By this simple means the nut can be quickly locked in position upon the axle-journal and all danger of retrograde movement obviated. The sockets 17 are of graduated depths increasing uniformly, as shown in Fig. 4, corresponding to the "pitch" of the threads of the nut, so that the bolt 18 will bear in the bottom of the sockets when in position therein.

Having thus described the invention, what is claimed is—

1. In a hub-attaching device, the axle-journal having a transverse cavity in its threaded portion, the hub-securing nut having a plurality of spaced sockets registering with said cavity and increasing in depth progressively, a bolt movable in said cavity, means for projecting said bolt into said sockets one at a time, and means for withdrawing said bolt from said sockets.

2. In a hub-attaching device, the axle-journal having a transverse cavity in its threaded portion and a slot intersecting the cavity, said slot having a lateral extension at one end, a hub-securing nut having sockets registering with said cavity, a spring-actuated bolt movable in said cavity, and a pin connected to said bolt and extending through said slot and adapted to be seated in said lateral extension when the bolt is in withdrawn position.

In testimony that I claim the foregoing as my own I have hereto affixed my signature in the presence of two witnesses.

PHILIP LE SUEUR.

Witnesses:
W. J. BRYANT,
E. I. BRYANT.